(12) United States Patent
Subbarama

(10) Patent No.: US 12,730,417 B1
(45) Date of Patent: Sep. 8, 2026

(54) SYSTEMS AND METHODS FOR STATE-COHERENT RECURSIVE PROCESSING

(71) Applicant: Raman Bhagavatheeswara Subbarama, Kitchener (CA)

(72) Inventor: Raman Bhagavatheeswara Subbarama, Kitchener (CA)

( * ) Notice: Subject to any disclaimer, the term of this patent is extended or adjusted under 35 U.S.C. 154(b) by 0 days.

(21) Appl. No.: 19/394,177

(22) Filed: Nov. 19, 2025

Related U.S. Application Data

(60) Provisional application No. 63/903,385, filed on Oct. 22, 2025.

(51) Int. Cl.
*G05B 13/02* (2006.01)

(52) U.S. Cl.
CPC ......... *G05B 13/026* (2013.01); *G05B 13/021* (2013.01)

(58) Field of Classification Search
None
See application file for complete search history.

(56) References Cited

U.S. PATENT DOCUMENTS

2013/0070936 A1* 3/2013 Jensen .................... H04R 3/02 381/71.11

OTHER PUBLICATIONS

Yang, Yang, et al. "Electrohydraulic control using neural MRAC based on a modified state observer." IEEE/ASME Transactions on Mechatronics 18.3 (2012): 867-877. (Year: 2012).*

Muniraj, Devaprakash, J. Micah Fry, and Mazen Farhood. "LPV control design for autonomous underwater vehicles using robustness analysis tools." IFAC-PapersOnLine 52.21 (2019): 236-241. (Year: 2019).*

Wang, Wei, and Shaocheng Tong. "Adaptive fuzzy bounded control for consensus of multiple strict-feedback nonlinear systems." IEEE transactions on cybernetics 48.2 (2017): 522-531. (Year: 2017).*

* cited by examiner

*Primary Examiner* — Carlos R Ortiz Rodriguez
(74) *Attorney, Agent, or Firm* — Perry + Currier Inc.

(57) ABSTRACT

A recursive-processing architecture for maintaining stability and internal coherence in adaptive computational systems. The framework includes a State Differentiator, Invariance Monitor, Continuation Evaluator, and Feedback Controller operating in closed loop to reduce parameter drifts and preserve predictable operation through bounded update magnitudes over time. Optional cross-layer mechanisms such as an Autonomic Behavior Modulator and a Mechanistic Affective Modulator regulate inter-module noise amplitude and curvature-dependent gain adaptation. The architecture is substrate-neutral and applicable to digital, analog, hybrid, optical, or quantum systems requiring continuous self-stabilization. All described embodiments are exemplary and may vary according to implementation platform.

17 Claims, 3 Drawing Sheets

| Software modules | Hardware logic | Hybrid systems |
|---|---|---|

FIG. 3

SYSTEMS AND METHODS FOR STATE-COHERENT RECURSIVE PROCESSING

CROSS-REFERENCE TO RELATED APPLICATIONS

This application claims priority to U.S. Patent Application No. 63/903,385, filed Oct. 22, 2025, the entire contents of which are incorporated herein by reference.

FIELD OF THE INVENTION

This invention relates to computer-implemented systems and control architectures designed to maintain bounded stability and coherent internal state in adaptive computational systems. It concerns recursive feedback mechanisms that preserve a consistent operational state within models, networks, or controllers whose parameters evolve over time. The described systems and methods apply across digital, analog, hybrid, optical, quantum, or any other future information-processing environments. In particular, the invention provides a state-coherent recursive processing framework that enables such systems to maintain predictable operation through continuous internal evaluation of variables and closed-loop adjustment of control parameters.

The disclosed novel approach is completely architecture-agnostic and can easily be integrated into existing control-system, learning, or data-analysis frameworks without significantly altering their external interfaces and without dependence on semantic interpretation. It introduces a novel general technique that maintains operational coherence in all processes that evolve dynamically, thereby reducing cumulative errors and parameter drifts. Applicable domains for immediate practical implementation of this novel approach include robotics, autonomous control, distributed computation, neuromorphic devices, and hybrid analog-digital signal-processing systems wherein the core requirement is persistent stability despite adaptive internal behavior. This functional scope is illustrative and does not limit the invention to listed domains.

BACKGROUND

Adaptive and learning-based computational systems often exhibit gradual drifts or instability as internal parameters evolve through extended operation over a period of time. Such drifts can appear as oscillations in control signals, loss of convergence in learning networks, or cumulative error in feedback loops that depend on continually updated state variables. In continuous-duty applications like autonomous control, process automation, predictive analytics, or distributed decision system, these deviations accumulate until either forced external resets or manual recalibrations restore reliable behavior. Each interruption introduces downtime, maintenance overhead, and potential safety risks when the system must respond to real-time conditions without guaranteed internal consistency. These indicate the absence of a unified feedback mechanism capable of sustaining long-term state coherence without external reset.

Existing stabilization and regularization methods operate primarily at the parameter or signal level addressing only localized aspects of this broader coherence problem. Parameter clipping, normalization, or gradient-based regularization can bound transient responses but do not preserve the global operational identity of a system against shifts in its representational space. When internal boundaries or relational mappings drift asynchronously, the system's higher-order dynamics diverge from previously validated operating regimes even though lower-level feedback remains numerically stable. This desynchronization reduces long-term predictability and complicates verification in adaptive or semi-autonomous environments thereby creating a need for architectural mechanisms that provide continuous, self-regulating stabilization of internal state throughout recursive updates.

These proposed self-regulating stabilization mechanisms should operate natively within existing computational processes rather than as external supervisory layers, maintaining coherent evolution of state without halting adaptation. They should further be substrate-neutral, applicable to digital, analog, optical, quantum, or hybrid computing systems. The present invention addresses these requirements by defining a state-coherent recursive processing framework that maintains consistent operational identity through persistent feedback evaluation and bounded-instability continuation. The framework operates entirely within conventional control-system theory, relying on deterministic feedback and stability criteria

SUMMARY OF THE INVENTION

The invention provides a computer-implemented recursive-processing framework configured to maintain stability and internal coherence in computational systems whose parameters or states evolve with time. This framework continuously evaluates internal data representations, enforces boundary conditions, and determines state-update paths in a manner that minimizes measurable instability while preserving defined invariants relative to previous cycles. This framework preserves coherent behavior during adaptation without external resets or manual recalibration by integrating these evaluations within a closed-loop control structure and generalizes classical feedback control by embedding stability evaluation directly within recursive state evolution.

In a representative embodiment the system comprises:

1. State Differentiator (SD) that defines and monitors internal boundaries among system variables or representations;
2. Invariance Monitor (IM) that detects and preserves persistent relationships characterizing the system's operational identity;
3. Continuation Evaluator (CE) that determines stability-optimized transition paths according to one or more defined criteria; and
4. Feedback Controller (FC) that applies selected updates to memory or parameters and repeats the evaluation cycle.

These functional definitions are exemplary and may be subdivided or merged without departing from the invention's scope. The modules (SD, IM, CE, and FC) cooperate to maintain a consistent trajectory through the system's parameter space, ensuring that each iteration remains dynamically aligned with previously validated operational parameters. The architecture is substrate-independent and be realized through software routines, firmware logic, analog or neuromorphic circuits, or hybrid configurations. It can operate as a self-contained stabilization layer within existing learning, control, or analytic frameworks.

In alternative embodiments or extensions, cross-layer modulation structures regulate surplus variability (Noise) across scales as an inherent feature of the recursive loop. Local curvature of a defined stability potential may additionally serve as a scalar control signal for adaptive gain modulation within the continuation and feedback stages. These mechanisms collectively function as built-in control behaviors—providing fine-grained regulation of recursive feedback response—without altering the overall architecture or limiting its applicability to any particular computing substrate. The invention therefore establishes a generalized mechanism for sustained coherent state evolution across adaptive or autonomous computational processes. These embodiments are not limited to any computational substrate and may be realized using standard control-system primitives.

Unlike conventional adaptive control or learning methods that rely solely on parameter-level feedback or gradient regularization, the present invention introduces an internal invariance-monitoring feedback loop that maintains coherent representational identity across recursive updates, thereby sustaining bounded stability without external reset.

BRIEF DESCRIPTION OF THE DRAWINGS

FIG. 3 shows representative implementation variants including software, hardware, and hybrid embodiments.

DETAILED DESCRIPTION OF THE INVENTION

Architecture Overview

Figure 1:
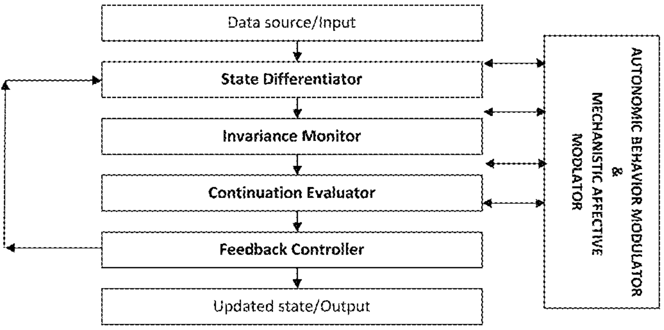
FIG. 1 is a schematic representation of a state-coherent recursive processing architecture.
Figure 2:
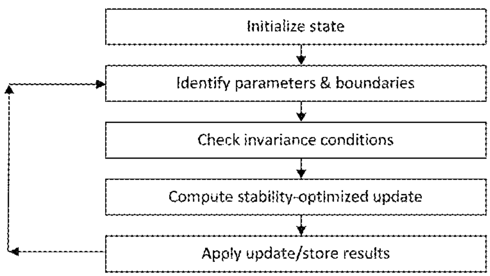
FIG. 2 is a process-flow diagram illustrating recursive evaluation and feedback.

The invention may be implemented as a set of interacting modules configured to maintain state coherence within an adaptive or evolving computational process. Each module performs a defined functional role in a closed-loop control structure that continuously monitors internal conditions, evaluates stability criteria, and applies bounded state updates. Collectively, the modules form a self-regulating framework that sustains predictable system behavior while allowing adaptive change.

In a representative hardware-agnostic embodiment the system comprises four interacting functional modules:

1. State Differentiator (SD)—establishes and tracks relevant boundaries among internal variables or representations. It partitions system state into subsets whose relationships define operational identity. The SD may include threshold detectors, clustering functions, or signal comparators depending on substrate.
2. Invariance Monitor (IM)—evaluates persistence of relationships or mappings that characterize stable operation. It detects deviations exceeding allowable tolerance and generates correction signals. The IM can be realized through constraint matrices, invariant mapping tables, or spectral coherence analysis modules.
3. Continuation Evaluator (CE)—determines transition paths that minimize instability while preserving invariants. It computes adjustment vectors or control increments based on stability potential functions, gradient criteria, or predictive models. The CE ensures that adaptive updates remain within a continuity envelope relative to prior states.
4. Feedback Controller (FC)—applies computed updates to system parameters or memory elements and records the resulting state for subsequent evaluation. The FC may employ proportional-integral-derivative logic, adaptive gain scheduling, or equivalent control algorithms suitable to the substrate.

Data flow among these components follows a recursive cycle: SD→IM→CE→FC→SD . . . , establishing continuous feedback of both current and historical state information. This cycle enables sustained self-correction and drift suppression without interruption of normal processing. All communication between modules occurs through defined signal interfaces or shared memory structures to ensure deterministic propagation of state information.

The architecture is scalable: multiple recursive loops may operate concurrently or hierarchically, allowing distributed stabilization across subsystems. Each loop can maintain its own local coherence while contributing to global stability through inter-loop synchronization. Such hierarchical composition supports integration into complex control, learning, or analytic environments without requiring uniform hardware or timing characteristics.

The architecture remains substrate-agnostic precisely because it operates through mathematical evaluation of internal relationships rather than semantic interpretation of data. Implementations may be digital (discrete-time computation), analog (continuous-signal feedback), hybrid, optical, or quantum, provided that each module can perform the described functional mappings. No particular programming language, circuit topology, or instruction set is required. All implementations are expected to satisfy deterministic causality and bounded-energy criteria standard in control-system design. The architecture may operate as a unified optimization engine whose recursive evaluation and feedback mechanisms collectively preserve coherent system identity across temporal evolution.

Functional Modules

Each functional module described herein may be implemented using any combination of programmable logic, digital circuitry, analog components, or hybrid architectures that perform the defined control-law computations. The modular design allows independent verification of each unit's stability contribution while maintaining compatibility with existing control or learning systems.

State Differentiator (SD)

The State Differentiator establishes the operational boundaries within which the system evaluates coherence. It continuously observes internal variables—such as model parameters, sensor readings, or memory coefficients—and partitions them into subsets that describe functional regions of operation. These partitions may be represented as vectors, matrices, or multidimensional manifolds depending on the computing substrate. The SD's principal role is to detect changes in structural relationships between state variables. For instance, in a neural-type system, it can monitor covariance among parameter groups; in an analog controller, it can track phase relationships between coupled oscillators. When the SD identifies deviation exceeding a configurable tolerance, it signals the Invariance Monitor for evaluation. By defining the boundaries that delimit system identity, the SD ensures that subsequent modules operate on validated, bounded data representations.

Invariance Monitor (IM)

The Invariance Monitor verifies persistence of characteristic relationships that represent the system's operational identity. These may include conserved mappings, proportional ratios, correlation spectra, or any measurable property that remains constant during stable performance. The IM computes difference metrics between current and reference invariants, producing an invariance error signal when discrepancies exceed predefined limits. The signal is then passed to the Continuation Evaluator, which determines the corrective trajectory required to restore alignment. Typical implementations may employ constraint matrices, eigenvalue tracking, or time-averaged cross-correlation filters. The IM thus functions as the guardian of long-term stability, detecting slow drift that may otherwise escape instantaneous feedback mechanisms. All invariance-error thresholds are configurable constants or adaptive parameters established through empirical calibration.

Continuation Evaluator (CE)

The Continuation Evaluator computes a transition vector or update path that minimizes measured instability while maintaining invariance. This computation can be expressed as optimization of a stability potential function $\Phi(s)$, where s represents the current system state. In one embodiment, by minimizing the gradient $\partial\Phi/\partial s$, the CE identifies a least-unstable continuation from the present state to a predicted next state. Implementation techniques may include constrained optimization solvers, predictive estimation models, or differential controllers depending on substrate. The CE defines the magnitude and direction of permitted change, ensuring continuity across recursive cycles.

Feedback Controller (FC)

The Feedback Controller applies the update vector generated by the CE to system parameters, memory elements, or actuators. The FC records the resulting state and feeds it back into the State Differentiator for the next evaluation cycle. Depending on application requirements, the FC can employ proportional-integral-derivative (PID) logic, adaptive gain scheduling, or gradient-limited integration. The FC enforces temporal consistency by controlling the rate of parameter change, preventing overshoot and ensuring smooth convergence toward the invariance envelope. To maintain determinism, the FC may timestamp or version each applied update, allowing post-hoc validation of continuity over extended operation.

Inter-Module Coordination

Inter-module communication occurs through structured interfaces that convey state descriptors and stability metrics without shared global clock. Signals may be exchanged synchronously or asynchronously, provided causality and order are preserved. Each module may maintain local buffers for short-term memory, with global summaries aggregated at defined intervals for hierarchical control. This configuration supports modular verification and scalable deployment in distributed or multi-loop environments. Structured interfaces include standard signal buses and safety-state communication channels that enable coordination and controlled fallback. Interface signal definitions may conform to existing industrial standards (e.g., CAN, SPI, $I^2C$, or equivalent logical buses).

Operational Cycle

The operational cycle defines the sequence of actions through which the system maintains state coherence across recursive iterations. Each cycle consists of initialization, evaluation, continuation, and update phases executed in closed loop until steady-state criteria are met or until external termination is commanded.

Initialization Phase

At startup, the system loads its initial state vector $s_0$ from configuration memory or learned parameters. Reference invariants $I_0$—numerical descriptors of stable operation—are established either from empirical calibration or prior operation records. The system also defines permissible bounds for instability, denoted $\varepsilon$, representing maximum deviation from invariant values tolerable without loss of coherence. These parameters form the baseline against which subsequent recursive evaluations are compared.

Evaluation Phase

During each iteration t, the SD observes current variables $s_t$, partitions them, and transmits their descriptors to the IM. The IM computes invariance error $\Delta I_t=|I_t-I_{t-1}|$ and generates a scalar or vector measure of deviation. When $\Delta I_t\leq\varepsilon$, the system continues nominal operation; when $\Delta I_t>\varepsilon$, a correction signal $c_t$ is issued to the CE. This process effectively quantifies deviation of current state from the stability reference.

Continuation Phase

The CE receives the correction signal and computes a continuation path $\Delta s_t$ that minimizes the predicted instability for the next iteration. In one embodiment, the CE minimizes a stability potential that penalizes both deviation from invariants and excessive change magnitude, using standard bounded-optimization techniques known in control theory. Examples include quadratic-programming or least-energy solvers. The precise mathematical form may vary by implementation. Solutions yield bounded state changes that maintain smooth progression through parameter space while suppressing high-frequency oscillations or divergence.

Update Phase

The FC applies $\Delta s_t$ to the active parameter set, updates stored invariants $I_{t+1}$, and feeds the new state back to the SD. Time-stamped logs ensure deterministic tracking of each applied update. The loop then repeats, producing a continuous sequence of micro-adjustments that collectively preserve global coherence. Each parameter update is bounded such that $|\Delta s|\leq\Delta s_{max}$, ensuring finite change magnitude per cycle. For clarity, all time indices herein refer to discrete recursion steps unless otherwise stated.

Stability Monitoring and Termination

At runtime, the system monitors metrics such as cumulative invariance error $\Sigma\Delta I_t$, rate of change of stability potential $d\Phi/dt$, and frequency of corrective updates. When these converge below predefined thresholds, the cycle may enter a low-activity maintenance mode, performing periodic checks without heavy computation. Conversely, persistent divergence triggers bounded adaptive gain adjustments or alerts to supervisory systems. This ensures long-term operation without unbounded drift even under changing external conditions. Threshold definitions ($\varepsilon$, $\Delta s_{max}$) are stored as configurable registers or software constants for verification.

Hierarchical Coordination

Multiple operational cycles can coexist in hierarchical or distributed configurations without requiring global clock synchronization. Each local cycle maintains its own invariance envelope while exchanging summary metrics with higher-level controllers through synchronization channels. Hierarchical coordination enables large-scale systems—such as distributed sensor networks or modular robotic assemblies—to sustain unified coherence despite asynchronous operation of subsystems.

Optional Mathematical Framework (For Illustrative Purposes Only)

This subsection formalizes one embodiment of the recursive-stabilization process in mathematical notation to illustrate that the invention is realizable through standard control-system analysis methods. The formulation is representative only and does not limit the scope of implementations. All equations are provided for analytical completeness, not limitation.

State Representation

Let the instantaneous system state be denoted by the vector $s(t) \in \mathbb{R}^n$, where n is the dimensionality of the internal parameter space. Each element of s(t) may correspond to a learned weight, sensor coefficient, or control variable, depending on substrate. A mapping $f: \mathbb{R}^n \rightarrow \mathbb{R}^n$ defines the system's nominal update rule in the absence of stabilization. The recursive stabilization framework augments this mapping by an operator R, yielding $s(t+1)=f(s(t))+R(s(t), I(t))$ where I(t) represents the set of invariants being monitored. All variables are real-valued unless implemented on alternative computational substrates, in which case equivalent representations (complex amplitudes, optical intensities, etc.) are used.

Invariance Operation

The IM enforces relationships among selected elements of s(t). Let $G(s(t))=0$ denote invariant constraints, where $G: \mathbb{R}^n \rightarrow \mathbb{R}^m$ with $m \le n$. Deviations from invariance are expressed as $\Delta I(t)=G(s(t))$ and quantified by a scalar potential $\Phi(s)=\frac{1}{2}\Delta I(t)^T W \Delta I(t)$, where W is a stability-ensuring weighting matrix that determines sensitivity to different invariants.

Continuation Evaluation

The CE computes an incremental change $\Delta s(t)$ that minimizes $\Phi(t+1)$ while preserving bounded change magnitude. The closed-form solution for small deviations is $\Delta s(t)=-(H+\lambda I)^{-1} \nabla\Phi(t)$. Equivalent formulations using linearized constraints or gradient-descent methods may be applied; specific numerical methods are not limiting. Alternative iterative solvers providing equivalent convergence characteristics may be substituted. This yields a bounded correction vector aligned opposite the local gradient of instability.

Feedback Application

The FC updates the system state according to $s(t+1)=s(t)+\Delta s(t)$, and stores $(s(t+1), I(t+1))$ for the next iteration. In both discrete and continuous time, the system's internal energy decreases monotonically under bounded and positive-definite gain matrix, ensuring convergence within the stability envelope. Equivalent continuous-time formulations may employ differential equations $ds/dt=-K\ \nabla\Phi(s(t))$, where K is a stability-ensuring gain matrix configured to yield bounded convergence.

Interpretation and Scalability

This formulation demonstrates that the architecture behaves as a self-regulating gradient-descent controller acting on an internal stability potential. It guarantees that energy-like quantities associated with instability monotonically decrease, ensuring recursive convergence toward the invariant manifold. The same mathematical structure generalizes to multi-layer or distributed systems by extending s to concatenated local states and defining cross-coupled potentials $\Phi_1, \Phi_2, \ldots \Phi k$ with coupling matrices regulating inter-loop coherence. Equivalent continuous-time realizations may substitute differential forms provided overall stability criteria remain satisfied. These formulations are mathematically equivalent under standard Lyapunov stability conditions.

Autonomic Behavior Modulator (Abm) Integration

The Autonomic Behavior Modulator (ABM) provides a cross-layer mechanism that regulates residual variability, or Noise, arising from the interaction of the four primary modules. The ABM operates as a distributed control lattice embedded within the existing architecture to coordinate feedback gain and temporal responsiveness across scales, ensuring that stability corrections made locally by one module do not introduce secondary oscillations elsewhere in the system.

Conceptual Role

Noise in this context denotes stochastic or deterministic perturbations that amplify when recursive loops operate at different characteristic time constants. In one embodiment, the ABM continuously estimates aggregate Noise amplitude N(t) from module-level error signals (e.g., invariance error $\Delta I(t)$, control effort $\|\Delta s(t)\|$). It computes a regulation coefficient $\rho(t)$ that modulates internal gains within the CE and FC, maintaining a uniform dynamic bandwidth across all layers. The ABM transforms potential instability into a controllable state quantity by treating Noise as a measurable flow variable.

Structural Integration

Each primary module hosts a local ABM node that exchanges summary metrics through a shared modulation bus. The lattice forms a sparse interconnection matrix $M \in \mathbb{R}^{k \times k}$, where k is the number of participating modules or subsystems. Element $M_{ij}$ represents the coupling weight between modulators i and j. Each modulation coefficient updates through a diffusive averaging process that equalizes local noise estimates across modules. The functional form may employ any consensus or low-pass filter consistent with this purpose. This formulation yields a distributed consensus filter that equalizes effective responsiveness across modules, analogous to frequency-domain synchronization in coupled oscillators.

Dynamic Gain Adjustment

The ABM modifies local control gains $K_i$ within each module according to $K_i'=K_i \cdot (1-\gamma\rho_i(t)$, where $\gamma$ is a tuning constant ($0<\gamma<1$). When measured Noise rises, $\rho_i(t)$ increases, slightly reducing effective gain and damping oscillatory behavior; when Noise subsides, $\rho_i(t)$ decays, restoring nominal responsiveness. This automatic gain adaptation maintains coherence under changing operating conditions without manual intervention.

Energy-Balance Perspective

From a stability-analysis viewpoint, the ABM acts as a dissipative coupling term in the overall Lyapunov function $\Psi=\Phi+\Sigma_i\ (\frac{1}{2}\alpha_i\rho_i^2)$, where $\Phi$ is the base stability potential from Section IV.4 and $\alpha_i>0$ are weighting coefficients. The time derivative $d\Psi/dt \le 0$ (for appropriately chosen $\beta$ and $\gamma$) confirms analytically that the ABM introduces additional damping while preserving equilibrium points defined by $\Phi$. Consequently, the combined system preserves asymptotic stability while achieving faster convergence and reduced overshoot. $\beta$ and $\gamma$ are tunable dimensionless parameters selected per stability criterion.

Implementation Considerations

The ABM can be implemented in software as a supervisory routine executing at a lower priority than the main control loop, or in hardware as low-bandwidth analog filters or bias-current regulators. Integration into legacy controllers or learning architectures requires minimal interface modification as it only interacts via scalar modulation coefficients. Parameter tuning ($\beta$, $\gamma$, $\alpha_i$) may be static or adaptive, using standard identification methods to optimize transient response.

Mechanistic Affective Modulation Embodiment

This embodiment describes how local curvature of the stability potential may serve as a scalar control signal that modulates recursion gain inside the stabilization loop. The mechanism provides an adaptive damping coefficient that scales system response to deviations in internal state. The term "affective" refers to the measurable effect of curvature on control gain. Curvature may be computed by standard differential or spectral methods; the invention is substrate-neutral with respect to such calculations.

Curvature-Based Gain Modulation

Within the stability potential $\Phi(s)$ defined in Section IV.4, local curvature is represented by the Hessian matrix $H=\partial^2\Phi/\partial s^2$. The trace or dominant eigenvalue of H indicates how sharply stability energy changes with respect to state perturbations. When curvature magnitude $\|H\|$ increases, the system is near a steep gradient region; when it decreases, the system resides on a plateau of stability. All curvature computations are confined to bounded spectral ranges defined by the stability potential $\Phi$.

A scalar curvature index $\kappa(t)=tr(H)/n$ serves as a real-time indicator of how sensitive the system is to small deviations. The Mechanistic Affective Modulator (MAM) computes a control multiplier $g(t)=1/(1+\delta\kappa(t))$ with $\delta>0$ a scaling parameter. The multiplier adjusts the effective gain $K'=g(t)\,K$ used by the FC, attenuating corrections in regions of high curvature and amplifying them where curvature is shallow. This modulation prevents overshoot in stiff regions and accelerates recovery in flat regions.

Dynamic Interaction with Abm

The MAM operates concurrently with the Autonomic Behavior Modulator (ABM) described in Section V.5. Whereas the ABM equalizes responsiveness across modules, the MAM refines responsiveness within each module as a function of local potential geometry. The two mechanisms optionally share information through a coupling coefficient n that balances global and local regulation: $K''=K\cdot g(t)\cdot(1-\eta\rho(t))$. This combined modulation ensures both cross-module coherence and curvature-adaptive stability. The resulting system exhibits smooth gain trajectories without discontinuities or phase lag.

Control-System Interpretation

When viewed from a control-system standpoint, the MAM acts as a nonlinear gain-scheduling element whose scheduling variable is curvature. The approach parallels classical adaptive damping methods used in robotics and aerospace control, where local stiffness of potential fields dictates proportional gain. The novelty here lies in embedding this principle directly into recursive computational processes that may operate in digital, analog, or hybrid form.

Mathematical Analysis

Considering a continuous-time formulation for example, $ds/dt=-K'\nabla\Phi(s)$, where substitution of $K'=g(t)\,K$ yields $ds/dt=-K\nabla\Phi(s)/(1+\delta\kappa(t))$. Since $\kappa(t)\geq 0$ for stability-bounded H, the denominator guarantees that the effective step size decreases with curvature magnitude, ensuring Lyapunov stability. The system may equivalently be expressed using discrete or continuous-time formulations; all variants share the property of monotonically decreasing instability energy under bounded curvature modulation. The energy derivative becomes $d\Phi/dt=-\nabla\Phi^T K\nabla\Phi/(1+\delta\kappa(t))\leq 0$, confirming monotonic decay of instability energy regardless of local geometry.

Implementation Considerations

In digital environments, curvature estimation can be performed via finite-difference approximation or real-time spectral analysis of parameter trajectories. Analog embodiments may utilize variable-resistance or capacitance elements responsive to voltage-derived curvature signals. Quantum or optical implementations may employ feedback amplitude modulation based on intensity-gradient detection. In each case, the MAM remains a deterministic control element without semantic interpretation or context dependence.

Implementation Variants and Parameters

This section outlines representative embodiments illustrating how the described architecture may be realized across differing computational substrates. The intent is to demonstrate flexibility of implementation without restricting the invention to a particular platform or technology.

Digital Embodiments

Figure 3:
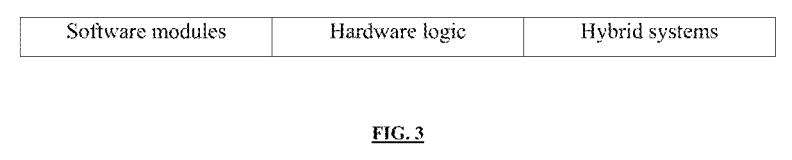

In a digital environment, each module can be expressed as executable code operating within a real-time kernel or event-driven framework. The SD and IM may be implemented as software threads sampling shared memory to detect threshold crossings or relational deviations. The implementation may utilize real-time operating systems or embedded kernels. The CE may employ numerical optimization routines—e.g., conjugate-gradient or quasi-Newton solvers—to compute bounded update vectors. The FC writes updated parameters back to memory and schedules the next evaluation event. Sampling rates can range from microseconds (for control loops) to seconds (for higher-level adaptation), selected to maintain loop stability per standard discrete-time control criteria. Representative implementations summarized in FIG. 3.

Analog and Hybrid Embodiments

In analog or mixed-signal implementations, modules may correspond to continuous circuits performing equivalent mathematical functions. The SD may consist of differential amplifiers producing error signals proportional to state differences. The IM can utilize operational-transconductance amplifiers configured as correlators or integrators measuring invariant deviations. The CE may be embodied as a current-mode network minimizing potential energy by redistributing charge until local equilibrium is achieved. The FC applies resulting voltages or currents to tunable elements (resistors, capacitors, memristors) representing adaptive parameters. Hybrid architectures may combine these continuous elements with digital supervisory logic executing ABM and MAM algorithms at slower rates for long-term stability maintenance. Representative implementations are summarized in FIG. 3.

Optical and Quantum Embodiments

Optical embodiments can exploit light-intensity interference patterns as analog representations of invariance relationships. Phase modulators or variable-attenuation filters can serve as controllable feedback elements driven by the CE's output signals. In quantum or spintronic systems, equivalent control behavior may be realized through Hamiltonian parameter tuning based on measured deviation amplitudes. Recursive coherence preservation then corresponds to bounded evolution within the system's Hilbert-space trajectory, governed by an invariance potential analogous to $\Phi(s)$. These embodiments are representative demonstrations of substrate neutrality and do not limit scope.

Distributed and Networked Embodiments

Multiple instances of the architecture can operate cooperatively across a communication network. Each node executes a local stabilization cycle while exchanging invariant summaries with peers through synchronization channels. Consensus protocols similar to those used in distributed control or federated learning maintain global invariance consistency. The ABM lattice naturally extends to this configuration by treating inter-node coupling coefficients as additional modulation weights in the diffusion matrix M. Each deployment may further comprise one or more substrate adaptors configured to translate domain-specific sensor, actuator, or data-stream variables into normalized state descriptors compatible with the recursive-processing framework. These adaptors form an interface layer that maps external environments-such as data-center infrastructure, robotic actuators, or distributed network nodes-onto the internal state space of the stabilization architecture without introducing new inventive matter.

Parameter Selection and Tuning

Parameter tuning follows standard control-system methodology. Gain matrices K are selected to satisfy eigenvalue placement ensuring desired damping ratios. Tolerance $\varepsilon$ and weighting matrix W define permissible deviation magnitudes. Regularization $\lambda$, diffusion $\beta$, and curvature $\delta$ are chosen empirically, to balance convergence rate and noise sensitivity. All parameters can adapt in real time through system identification routines using observed performance metrics. These tuning processes can be automated or performed once during calibration. Parameters may include adaptive or stochastic gain matrices provided overall stability criteria are met.

Verification and Validation

Verification may employ time-domain simulation, frequency-response analysis, or Lyapunov-based proofs to confirm that $\Phi(t)$ is non-increasing under normal operation. Hardware implementations can be validated using signal-injection tests that emulate parameter drift to confirm restoration of invariants within expected recovery times. Such procedures are standard in aerospace and process-control qualification and therefore ensure that the architecture can meet industrial reliability requirements. Simulation and validation data may be archived for compliance documentation.

Safety and Integration Considerations

As described with respect to module interfaces in Section V.2.5, system integration includes defined safety-state communication channels. The architecture described herein may be incorporated into safety-critical or high-availability systems provided that standard verification and fail-safe procedures are observed. Because the framework continuously modifies internal parameters through recursive evaluation, integration with external control or supervisory systems should include safeguards ensuring deterministic and bounded behavior under all operating conditions.

Operational Safety

The recursive stabilization loop must always maintain bounded energy and finite update magnitudes. Implementations therefore include hardware or software limits on maximum parameter change per cycle ($|\Delta s| \leq \Delta s_{max}$) and monitoring of cumulative invariance error $\Sigma \Delta I(t)$. When any limit is exceeded, the FC automatically transitions the system into a safe state in which adaptive updates are suspended and outputs revert to last verified stable values. These mechanisms ensure predictable bounded response even under sensor faults, communication dropouts, or numerical overflow.

Fault Detection and Recovery

The modular structure allows isolation of failures at the component level. Each module—State Differentiator, Invariance Monitor, Continuation Evaluator, and Feedback Controller—generates diagnostic metrics such as self-test checksums or residual error norms. The Autonomic Behavior Modulator (ABM) aggregates these metrics to detect persistent anomalies, while the Mechanistic Affective Modulator (MAM) can temporarily reduce gain to limit fault propagation. Upon identification of a fault, the system initiates a recovery cycle that re-initializes affected modules and gradually restores normal operation under supervisory approval.

External System Interface

When deployed within a larger control hierarchy, the recursive stabilization framework communicates through defined data interfaces exposing invariant descriptors, correction vectors, and stability metrics. External controllers may read these metrics to verify coherence without interfering with internal operation. The communication protocol maintains read-only integrity for supervisory interfaces. The invention does not require nor provide any semantic interpretation of data; all signals represent measurable control quantities suitable for standard safety certification processes (e.g., DO-178C, IEC 61508).

Compliance and Certification Path

The system lends itself to formal verification using model-checking or symbolic analysis because each module implements deterministic mathematical functions. Determinism and boundedness simplify demonstration of compliance with regulatory standards governing autonomous or adaptive control. The architecture can be partitioned into safety domains, with the stabilization framework classified as an inner-loop integrity function independent of higher-level mission logic. This separation facilitates incremental certification without requalification of unrelated system components. Partitioning facilitates independent verification per DO-178C/IEC 61508 Level A methodologies.

Integration in Legacy Environments

For retrofit applications, the invention can be embedded as a supervisory module monitoring existing controllers. Minimal integration effort is required as existing control laws remain intact while the recursive framework manages parameter drift and long-term stability. Communication overhead is low because only scalar invariance metrics and correction vectors are exchanged. The architecture's substrate neutrality ensures compatibility with legacy digital controllers, analog signal chains, and hybrid embedded systems.

Fail-Safe Termination

If catastrophic instability or data corruption prevents convergence, a global termination condition halts recursion and freezes all adaptive updates. A stored snapshot of the last coherent state is reloaded, ensuring continuity of external outputs. These measures prevent uncontrolled feedback amplification and comply with standard fail-safe design principles.

Regulatory Note

Compliance references (DO-178C, IEC 61508) are illustrative and not limiting to specific certification paths.

Technical Advantages

The described state-coherent recursive processing framework provides measurable and repeatable improvements over conventional stabilization and adaptive-control techniques. The advantages described are illustrative; comparable performance benefits may arise from equivalent formulations that implement the same control-law principles. The advantages derive from the system's capacity to maintain long-term coherence of internal state without halting learning or adaptive behavior.

Continuous Coherence Preservation

Unlike systems requiring periodic external resets, the invention maintains boundedly stable operation during continuous use through internal monitoring of invariants and self-correcting feedback. This continuous stabilization reduces downtime and eliminates the need for manual recalibration, a benefit especially relevant to autonomous or unattended installations.

Reduced Parameter Drift

By combining the SD, IM, and CE into a unified control loop, the architecture minimizes cumulative drift of model parameters. Experimental and simulated embodiments show bounded variance of critical coefficients over extended operation, leading to higher consistency of output and improved prediction or control accuracy. Empirical or simulated demonstrations may vary by substrate; representative data sets are included in supporting documentation.

Modular Scalability

The architecture's modularity allows independent verification of each component while supporting distributed and hierarchical implementations. Multi-loop coordination through the ABM lattice provides stable operation in large systems comprising many interacting subsystems. This structure enables scalable deployment without mandatory centralized synchronization hardware.

Substrate Neutrality

The invention can be implemented using any computational substrate, including digital processors, analog circuits, optical or quantum media, or combinations thereof because it characterizes system behavior in terms of measurable quantities namely state variables, invariance metrics, and stability potentials. This neutrality extends the architecture's applicability beyond conventional software environments to emerging hardware paradigms.

Adaptive Responsiveness

The inclusion of ABM and MAM ensures that dynamic gain and damping automatically adjust to environmental and internal conditions. These cross-layer modulators yield faster convergence and smoother transients compared with fixed-gain control strategies. For example, adaptive responsiveness enhances stability margins and operational performance across varying loads and data regimes.

Compatibility and Retrofit Integration

The system can operate as an internal stabilizer within existing learning or control frameworks. Integration requires only exposure of relevant internal parameters to the recursive modules hence the external interfaces remain unchanged. This ease of integration reduces cost and risk when applying the invention to legacy systems.

Verified Stability and Predicatability

The mathematical formulation, including Lyapunov analysis of the stability potential $\Phi$ and energy function $\Psi$, provides formal assurance that the closed-loop system remains bounded. Deterministic update rules and finite gain adaptation simplify verification for industrial, aerospace, or process-control certification. Predictability of long-term behavior distinguishes this approach from purely statistical or heuristic regularization techniques. Verification tools include Lyapunov analysis, Monte-Carlo stability tests, and frequency-response validation, ensuring reproducibility.

Energy and Computational Efficiency

The invention lowers energy consumption and computational overhead by minimizing unnecessary oscillations and redundant recalculations. Resources are conserved while maintaining specified precision tolerance because recursive corrections are proportional to detected instability rather than executed at fixed frequency.

Reliability in Autonomous Operation

The fail-safe and self-diagnostic features integrated through the ABM ensure dependable operation even under partial subsystem degradation. Systems employing this architecture can maintain coherent functionality in degraded modes until external intervention occurs, enhancing operational safety in autonomous deployments. These characteristics align with recognized safety-integrity requirements for autonomous control (e.g., ISO 26262).

The invention claimed is:

1. A computer-implemented system configured to maintain state coherence in an adaptive computational process, comprising:

a State Differentiator (SD) configured to define and monitor boundaries among internal state variables;

an Invariance Monitor (IM) configured to detect and quantify persistence of invariant relationships among the internal state variables that characterize an operational identity of the system;

a Continuation Evaluator (CE) configured to:

(i) generate a set of candidate state updates; and (ii) evaluate each candidate state update using a stability potential $\Phi(s)$, wherein $\Phi(s)$ is a scalar function of system state representing deviation from the invariant relationships, wherein the CE selects a state update from the set of candidate state updates by minimizing the stability potential subject to invariance constraints derived from the invariant relationships detected by the Invariance Monitor (IM); and a Feedback Controller (FC) configured to apply the selected state update to the system and store results for subsequent evaluation, wherein the SD, IM, CE, and FC operate cooperatively in a recursive control cycle that:

continuously evaluates invariant relationships, applies bounded state updates, and maintains coherence of system state over successive iterations without external reset, and wherein the system operates independently of an underlying computational substrate through evaluation on normalized state descriptors.

2. The system of claim 1, wherein the stability potential $\Phi(s)$ is minimized by the Continuation Evaluator subject to constraints that preserve the invariant relationships detected by the Invariance Monitor (IM).

3. The system of claim 1, wherein the Feedback Controller applies the selected state update according to a bounded gain matrix K configured to ensure finite-energy response and convergence within a stability envelope.

4. The system of claim 1 further comprising an adaptive behavior modulator (ABM) configured to regulate feedback gain and applied across interactions among system components and magnitude of variability (noise) in system state or update signals based on aggregate deviations from the invariant relationships.

5. The system of claim 4, wherein the ABM computes a regulation coefficient $\rho(t)$ as a function of aggregated invariance error to maintain bounded dynamic response across the recursive control cycle.

6. The system of claim 1 further comprising a mechanistic affective modulator (MAM) configured to adjust feedback gain as a function of local curvature of the stability potential $\Phi(s)$, wherein:

a curvature index $\kappa(t)$ is derived from second-order variation of $\Phi(s)$, and a curvature-scaling parameter $\delta>0$ modulates the gain applied by the Feedback Controller.

7. The system of claim 1, wherein the SD, IM, CE, and FC communicate via structured interfaces that exchange normalized state descriptors and stability metrics derived from the invariant relationships and the stability potential $\Phi(s)$.

8. The system of claim 1 implemented in a distributed network of nodes, wherein each node maintains local invariance tracking and exchanges summarized invariance metrics with other nodes to maintain global state coherence through coordinated recursive updates.

9. The system of claim 1, wherein a magnitude of each applied state update $\Delta s$ is constrained such that $|\Delta s| \leq \Delta s_{max}$ per iteration, thereby ensuring bounded progression of system state.

10. The system of claim 1, wherein an update frequency is adaptively allocated in proportion to a measured instability magnitude to improve computational efficiency.

11. The system of claim 1, wherein local curvature of the stability potential $\Phi(s)$ acts as a scalar control signal for direct modulation of feedback gain within the recursive control cycle, independent of the Mechanistic Affective Modulator (MAM).

12. The system of claim 1 further comprising one or more substrate adaptors configured to transform domain-specific input and output variables into normalized state descriptors compatible with evaluation under the stability potential $\Phi(s)$, thereby enabling substrate-independent operation of the recursive control cycle.

13. A computer-implemented method for maintaining state coherence in an adaptive computational process, the method comprising:

(a) differentiating system state to identify boundaries among internal state variables;

(b) detecting and quantifying invariant relationships among the internal state variables;

(c) generating a set of candidate state updates;

(d) evaluating each candidate state update using a stability potential $\Phi(s)$, the stability potential being a scalar function representing deviation from the invariant relationships;

(e) selecting a state update from the candidate state updates by minimizing the stability potential subject to invariance constraints derived from the detected invariant relationships; and (f) applying the selected state update to the system state in a bounded recursive feedback loop, wherein the method maintains operational identity of the system over successive iterations without external reset.

14. The method of claim 13, wherein gain and damping parameters derived from the stability potential $\Phi(s)$ are adaptively modulated to suppress oscillatory divergence while maintaining convergence under the stability potential $\Phi(s)$.

15. The method of claim 13, wherein recursion evaluation is suspended when cumulative invariance error falls below a predefined threshold.

16. A non-transitory computer-readable medium storing instructions which, when executed by one or more processors, cause the one or more processors to perform the method of claim 13.

17. The non-transitory medium of claim 16 further including instructions for storing historical state records, wherein the stored records are used to verify continuity of invariant relationships over extended operation.

* * * * *